United States Patent [19]

Tamura et al.

[11] Patent Number: 5,224,044
[45] Date of Patent: Jun. 29, 1993

[54] SYSTEM FOR CONTROLLING DRIVING CONDITION OF AUTOMOTIVE DEVICE ASSOCIATED WITH VEHICLE SLIP CONTROL SYSTEM

[75] Inventors: Hideyuki Tamura; Hiroyuki Ueda; Nobutaka Takahashi, all of Kanagawa, Japan

[73] Assignee: Nissan Motor Company, Limited, Yokohama, Japan

[21] Appl. No.: 657,935

[22] Filed: Feb. 21, 1991

Related U.S. Application Data

[63] Continuation of Ser. No. 305,907, Feb. 3, 1989, abandoned.

[30] Foreign Application Priority Data

| Feb. 5, 1988 | [JP] | Japan | 63-14854[U] |
| Feb. 5, 1988 | [JP] | Japan | 63-25957 |
| Feb. 8, 1988 | [JP] | Japan | 63-28385 |
| Feb. 10, 1988 | [JP] | Japan | 63-29905 |

[51] Int. Cl.⁵ .................... F02D 9/02; B60K 28/16
[52] U.S. Cl. ................. 364/426.03; 364/431.05; 364/431.08; 180/197; 123/340
[58] Field of Search ........ 364/426.01, 426.02, 364/431.03, 431.08, 426.03, 431.05; 123/361, 339, 340, 198 DB; 180/197, 53.8; 303/100

[56] References Cited

U.S. PATENT DOCUMENTS

| 4,344,398 | 8/1982 | Ikeura | 123/339 |
| 4,345,557 | 8/1982 | Ikeura | 123/339 |
| 4,365,599 | 12/1982 | Ikeura | 123/339 |
| 4,367,531 | 1/1983 | Furuhashi et al. | 364/431.08 |
| 4,402,289 | 9/1983 | Ikeura | 123/339 |
| 4,403,584 | 9/1983 | Suzuki et al. | 123/417 |
| 4,406,261 | 9/1983 | Ikeura | 123/339 |
| 4,406,262 | 9/1983 | Ikeura | 123/339 |
| 4,616,621 | 10/1986 | Kuriowa et al. | 123/339 |
| 4,625,281 | 11/1986 | Deutsch | 364/431.03 |
| 4,672,935 | 6/1987 | Abe | 123/339 |
| 4,682,667 | 7/1987 | Hosaka | 180/197 |
| 4,688,530 | 8/1987 | Nishikawa et al. | 180/53.8 |
| 4,710,881 | 12/1987 | Mouri et al. | 364/431.08 |
| 4,736,814 | 4/1988 | Yogo et al. | 123/198 DB |
| 4,739,856 | 4/1988 | Inagaki et al. | 180/197 |
| 4,766,545 | 8/1988 | Nagai | 364/431.08 |
| 4,768,608 | 9/1988 | Hrovat | 364/426.02 |
| 4,771,850 | 9/1988 | Matsuda | 180/197 |
| 4,811,808 | 3/1989 | Matsumoto et al. | 180/197 |
| 4,819,171 | 4/1989 | Morita | 364/431.08 |
| 4,903,210 | 2/1990 | Akasu | 364/431.08 |
| 4,922,429 | 5/1990 | Nakajima et al. | 364/431.05 |

Primary Examiner—Parshotam S. Lall
Assistant Examiner—Michael Zanelli
Attorney, Agent, or Firm—Foley & Lardner

[57] ABSTRACT

A system for controlling an automotive devices, such as an automotive internal combustion engine, an engine accessory and so forth, is associated with a traction control system for cooperation therewith. The automotive device control system is so associated with the traction control system that normal mode control is disabled in response to initiation of the traction control for avoiding mutual interference of controls, or, in the alternative, a control signal value is modified for harmonizing automotive device control with the traction control.

16 Claims, 7 Drawing Sheets

SYSTEM FOR CONTROLLING DRIVING CONDITION OF AUTOMOTIVE DEVICE ASSOCIATED WITH VEHICLE SLIP CONTROL SYSTEM

This application is a continuation, of application Ser. No. 07/305,907, filed Feb. 3, 1989, now abandoned.

BACKGROUND OF THE INVENTION

1. Field of the Invention

The present invention relates generally to a control system which controls operation of automotive devices, such as an internal combustion engine and/or accessories thereof. More specifically, the invention relates to a control system for automotive devices which are associated with a vehicular slip control, such as a traction control for adjusting driving torque to be distributed to a vehicular driving wheel for preventing the driving wheel from causing excessive wheel slip.

2. Description of the Background Art

In recent years, traction control systems have been developed and proposed for optimizing vehicular driving performance and for better vehicle driving stability by preventing driving wheels from causing excessive slippage. Such traction control systems have been realized by advanced technologies in microprocessors having substantially high speed in data processing. For example, one of typical traction control systems has been proposed in Japanese Patent First (unexamined) Publication (Tokkai) Showa 62-150034. The disclosed traction control system includes an auxiliary throttle valve in an air induction system for performing adjustment of induction air in traction control. The auxiliary throttle valve is associated with a throttle servo mechanism which is controlled by a control unit performing traction control in response to wheel slippage. Namely, when wheel slippage occurs, the control unit becomes active to reduce the opening angle of the auxiliary throttle valve to reduce intake air flow rate and whereby reduce the engine output torque to suppress wheel slippage at driving wheels.

In general, such traction control systems are effective for optimizing vehicle driving performance and for providing satisfactory vehicle driving stability.

On the other hand, the traction control systems in the prior art have been so designed as to perform slip or traction control operation independently of other control, such as engine control, engine accessory control and so forth. This tends to cause mis-matching of control to cause degradation of the performance of various automotive devices, such as the internal combustion engine, the engine accessories and so forth. For example, knock suppressive spark ignition timing control for the internal combustion engine is performed independently of the traction control. Therefore, when a knocking suppression mode spark advance retarding operation is performed while traction control is active, the engine driving torque is fluctuated from a target value by spark advance retarding operation. This causes error in both of the traction control and the spark ignition timing control. Similarly, in case of an air/fuel ratio control in the automotive internal combustion engine, though acceleration enrichement is disabled, feedback control for maintaining the oxygen concentration in an engine exhaust gas at a stoichiometric value. This causes an abnormal value in the oxygen concentration indicative feedback signal. This causes a overrich or an overlean air/fuel mixture in the engine cylinder.

In case of an automotive air conditioning system, ON/OFF control of an engine driven compressor in the air conditioning system has been performed independently of the traction control. Therefore, the engine driven compressor can turn ON or OFF during traction control to vary the engine load. Variation of the engine load causes variation of engine output torque to cause error in the traction control.

SUMMARY OF THE INVENTION

It is an object of the present invention to provide a control system for an automotive device, which control system is associated with a traction control system for optimizing performance of both controls.

Another object of the invention is to provide an engine control system which controls at least one of an air/fuel ratio, an auxiliary air flow rate and a spark ignition timing, which engine control system is so associated with a traction control system for optimizing performance of the traction control and the engine control.

A further object of the invention is to provide a control system for an engine accessory controlling at least one of an automotive air conditioning system and a power steering system, which control system is associated with a traction control for optimizing both control operations.

In order to the aforementioned and other objects, a system for controlling an automotive devices, such as an automotive internal combustion engine, an engine accessory and so forth, according to the present invention, is associated with a traction control system for cooperation therewith. The automotive device control system is so associated with the traction control system that normal mode control is disabled in response to initiation of the traction control for avoiding mutual interference of controls, or, in the alternative, a control signal value is modified for harmonizing automotive device control with the traction control.

According to one aspect of the invention, a control system for automotive vehicle comprises:

an internal combustion engine having an air induction system in which is disposed a first throttle valve associated with a manually operable accelerator to be controlled, the angular position of the value depending upon the operation magnitude of the accelerator;

a traction control system detecting wheel slippage and adjusting the distribution of driving torque for driving wheels when the magnitude of the wheel slippage is greater than a predetermined wheel slippage threshold;

sensor means for monitoring a driving condition of the engine for producing a control parameter indicative signal;

a controller means for receiving the control parameter indicative signal for controlling operation of an associated vehicular device, the controller means operating in mutually distinct first and second control modes for controlling the vehicular device at mutually different first and second control characteristics, and the controller means selecting the first mode for performing control operation for the vehicular device when the traction control system is in inactive and the second mode when the traction control system is in active state.

According to another aspect of the invention, an air/fuel ratio control system for an automotive internal combustion engine, comprises:

an air induction system for introducing an intake air and a controlled amount of fuel into an engine combustion chamber, in which is disposed a first throttle valve associated with a manually operable accelerator to be controlled, the angular position of the value depending upon the operation magnitude of the accelerator;

a fuel supply means, associated with the induction system, for supplying controlled the amount of fuel to the induction system;

a traction control system detecting wheel slippage and adjusting the distribution of driving torque for driving wheels when the magnitude of the wheel slippage is greater than a predetermined wheel slippage threshold;

sensor means for monitoring driving parameters including an oxygen concentration in an exhaust gas of the engine and for producing control parameter indicative signals;

a controller means for receiving the control parameter indicative signals and for controlling the fuel supply means for adjusting the fuel supply amount for the induction system on the basis of the control parameter indicative signals, the controller deriving the fuel supply amount for maintaining an air/fuel ratio of an air/fuel mixture to be introduced into the engine combustion chamber to a stoichiometric value on the basis of the oxygen concentration in a first control mode which is selected while the traction control system is held in an inactive state, and deriving the fuel supply amount irrespective of the oxygen concentration in a second control mode which is selected when the traction control system is in an active state.

According to a further aspect of the invention, a spark ignition timing control system for automotive internal combustion engine comprises:

an air induction system for introducing an intake air and a controlled amount of fuel into an engine combustion chamber, in which is disposed a first throttle valve associated with a manually operable accelerator to be controlled, the angular position depending upon the operation magnitude of the accelerator;

a fuel supply means, associated with the induction system, for supplying a controlled amount of fuel to the induction system;

a spark ignition system, associated with the engine combustion chamber, for initiating spark ignition at a controlled spark ignition timing;

a traction control system detecting wheel slippage and adjusting the distribution of driving torque for driving wheels when the magnitude of the wheel slippage is greater than a predetermined wheel slippage threshold;

sensor means for monitoring driving parameters including an engine knocking magnitude and for producing control parameter indicative signals;

a controller means for receiving the control parameter indicative signals for controlling the spark ignition system for performing spark ignition at a timing derived on the basis of the control parameter indicative signals, the controller deriving the spark ignition timing on the basis of the engine knocking magnitude for suppressing engine knocking in a first control mode which is selected while the traction control system is held in an inactive state, and deriving the spark ignition timing irrespective of the engine knocking magnitude in a second control mode which is selected when the traction control system is in an active state.

According to a still further aspect of the invention, an auxiliary air control system for an automotive internal combustion engine, comprises:

an air induction system for introducing an intake air and a controlled amount of fuel into an engine combustion chamber, in which is disposed a first throttle valve associated with a manually operable accelerator to be controlled, the angular position of the value depending upon operation magnitude of the accelerator;

a fuel supply means, associated with the induction system, for supplying a controlled amount of fuel to the induction system;

an auxiliary air indication system including a by-pass passage by-passing the first throttle valve, the auxiliary air induction system having an auxiliary air flow control valve for adjusting air flow rate through the by-pass passage;

a traction control system detecting wheel slippage and adjusting distribution of driving torque for driving wheels when the magnitude of the wheel slippage is greater than a predetermined wheel slippage threshold;

sensor means for monitoring driving parameters for producing control parameter indicative signals;

a controller means for receiving the control parameter indicative signals for controlling the auxiliary air flow rate on the basis of the control parameter indicative signals, the controller deriving a basic auxiliary air flow rate on the basis of preselected control parameters, modifying the basic auxiliary air flow rate on the basis of predetermined correction factors for controlling the auxiliary air flow control valve for adjusting the auxiliary air flow rate at the modified auxiliary air flow rate in a first control mode which is selected while the traction control system is held in an inactive state, and controlling the auxiliary air flow control valve for adjusting the auxiliary air flow rate at the basic auxiliary air flow rate in a second control mode which is selected when the traction control system is in an active state.

According to a yet further aspect of the invention, a control system for automotive engine driven device, comprises:

an air induction system for introducing an intake air and a controlled amount of fuel into an engine combustion chamber, in which is disposed a first throttle valve associated with a manually operable accelerator to be controlled the angular position depending upon operation magnitude of the accelerator;

a fuel supply means, associated with the induction system for supplying a controlled amount of fuel to the induction system;

a traction control system detecting wheel slippage and adjusting distribution of driving torque for driving wheels when magnitude of the wheel slippage is greater than a predetermined wheel slippage threshold;

sensor means for monitoring driving parameters for producing control parameter indicative signals;

an engine driven device which is associated with the engine output shaft to be driven by the engine output, the engine driven device including means for connecting and disconnecting the engine output shaft to and from the device;

a controller means for receiving the control parameter indicative signals and for controlling operation of the connecting and disconnecting means for selectively establishing connection between the engine output shaft and the engine driven device and the disconnection therebetween, the controller means performing switching of state of the connecting and disconnecting means between the connecting state and the disconnecting state when a condition satisfying predetermined switching condition is detected from the control parameter indicative signals in a first control mode which is selected while the traction control system is held in inactive state, and disabling a switching operation between the connecting state and diconnecting state in a second control mode which is selected when the traction control system is in active state.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
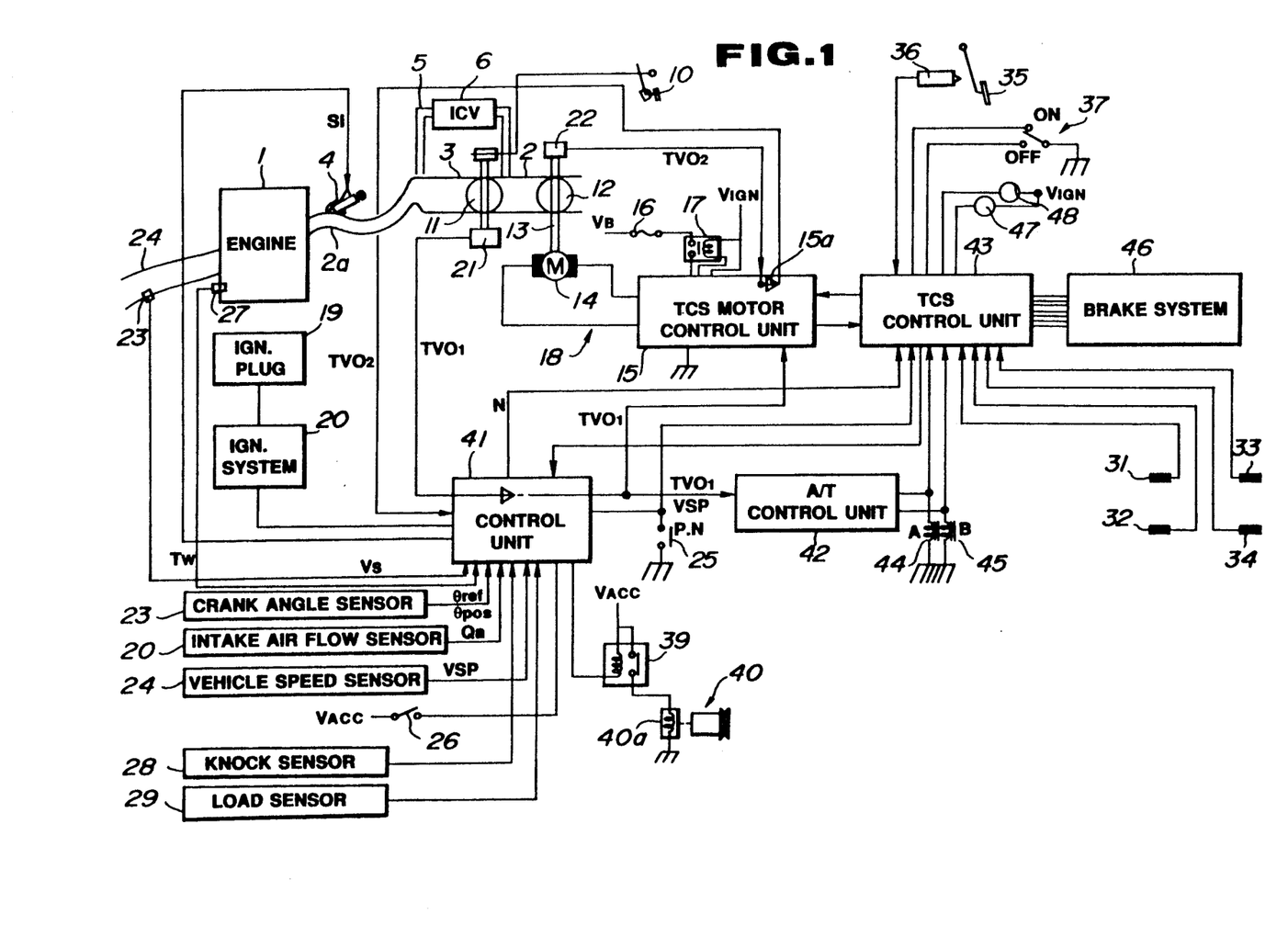
FIG. 1 is a schematic block diagram of the preferred embodiment of a control system according to the present invention, which performs air/fuel ratio control, auxiliary air control, spark ignition timing control and air conditioning system control in combination with traction control.

Referring now to the drawings, particularly to FIG. 1, the preferred embodiment of a control system, according to the present invention, will be described herebelow in terms of that applied to an automotive vehicle which is associated with a tandem throttle type traction control system.

The control system is designed to control an automotive internal combustion engine 1 which has an air induction system 2. A throttle chamber 3 is provided in the air induction system 2, in which throttle valves 11 and 12 are pivotably disposed for controlling intake air flow rate. The throttle valve 11 is a primary throttle valve mechanically connected to a manually operable accelerator 10, such as an accelerator pedal. A throttle valve shaft, which is rotatable for pivotally driving the primary throttle valve 11, is connected to a throttle angle sensor 21. The throttle angle sensor 21 comprises a potentiometer, for example, and monitors a throttle valve angular position to produce a primary throttle valve angle position indicative signal $TVO_1$. The throttle valve 12 is provided in tandem fashion with the primary throttle valve 11 and pivotable supported by a rotary shaft 13. The throttle valve 12 will be hereafter referred to as "TCS throttle valve". The rotary shaft 13 is associated with a traction control servo motor 14, at one end. The traction control servo motor 14 is controlled by a traction control signal for driving the rotary shaft 13 for positioning the traction control throttle valve 12 at a desired angular position. The traction control servo motor 14 comprises a DC (direct current) stepping motor and will be hereafter referred to as "TCS motor". The TCS motor normally places the TCS throttle valve 12 at fully open position. The On the other hand, the other end of the rotary shaft 13 is connected to a throttle angle sensor 22. The throttle angle sensor 22 is designed to monitor the angular position of the traction control throttle valve 12 and produces a TCS throttle valve angle position indicative signal $TVO_2$.

The TCS motor 14 is connected to a TCS motor control unit 15 to be driven at a controlled magnitude for positioning the TCS throttle valve 12 at the desired position. The TCS motor control unit 15 is connected to a vehicle battery (not shown) to receive battery power $V_B$ via a fuse 16 and a relay 17. The relay 17 has a relay coil connected to an ignition switch (not shown). The relay coil of the relay 17 is energized by a power supplied through the ignition switch. The TCS throttle valve 12, the TCS motor 14, the TCS motor control unit 15, the fuse 16 and the relay 17 form a traction control system 18.

By-passing the primary throttle valve 11, an auxiliary air passage 5 with an auxiliary air control valve 6 is provided for controlling auxiliary air flow rate introduced through the auxiliary air passage. The air induction system 2 also has an intake manifold connecting the throttle chamber 3 to an intake port (not clearly shown). One or more fuel injection valves 4 is inserted into the intake manifold for injecting a controlled amount of fuel at a controlled timing for forming an air/fuel mixture to be introduced into an engine combustion chamber in the internal combustion engine 1.

The internal combustion engine 1 is also associated with a spark ignition system 20 with spark ignition plugs 19 which are inserted into respective engine cylinders for initiating combustion of the air/fuel mixture at controlled timings determined in relation to engine revolution cycles. The spark ignition system 20 may include an ignition coil, a distributor unit and so forth for distributing an ignition power to respective spark ignition plugs 19.

The internal combustion engine 1 also has an exhaust system for discharging an exhaust gas therethrough. An oxygen sensor 23 is inserted into an exhaust pipe 24 for monitoring oxygen concentration which is representative of an air/fuel ratio of the air/fuel mixture undergoing combustion in the combustion chamber, to produce an oxygen concentration indicative feedback signal Vs.

The TCS throttle valve angle position indicative signal $TVO_2$ is fed from the throttle angle sensor 22 to the TCS motor control unit 15 and is temporarily stored in a buffer 15a. From the buffer 15a, the TCS throttle valve angle position indicative signal $TVO_2$ is fed to a control unit 41. Also, the primary throttle valve angle position indicative signal $TVO_1$ and the oxygen concentration indicative signal Vs are directly input to the control unit 41. Furthermore, the control unit 41 is connected to a crank angle sensor 23, an intake air flow sensor 20, a vehicle speed sensor 24, an engine coolant temperature sensor 27, an engine knock sensor 28, a load sensor 29, a transmission neutral position switch 25, and so forth. The crank angle sensor 23 is generally associated with a crankshaft or a rotor in the distributor of the ignition system for monitoring an engine revolution cycle position to produce a crank reference signal $\theta_{ref}$ at every predetermined crankshaft angular positions, e.g. every 120° of 6-cylinder engine and every 180° of 4-cylinder engine, and a crank position signal $\theta_{pos}$ at every given angle, e.g. 2° of crankshaft angular displacement.

The intake air flow sensor 20 may comprise an air flow meter, an intake vacuum sensor and so forth for monitoring an amount of air flowing through the air induction system to produce an intake air flow rate signal Qa. Though the shown embodiment employs the intake air flow sensor for obtaining intake air flow rate data, it is possible to neglect this sensor and obtain the equivalent or more precise intake air flow rate data arithmetically on the basis of the throttle valve open angle data as represented by the primary and TCS throttle valve angle position indicative signals $TVO_1$ and $TVO_2$.

The vehicle speed sensor 24 may comprise a proximity sensor, a magnetoelectric or a photoelectric sensor and so forth, generally associated with a propeller shaft or drive shaft for monitoring the vehicle speed to produce a vehicle speed indicative signal VSP. The knock sensor 28 may comprise a piezoelectric vibration sensor mounted on the engine cylinder block to monitor vibration induced on the engine cylinder to produce a knock indicative signal Ve when the magnitude of the engine block vibration is greater than a predetermined engine knocking threshold.

The load sensor 29 is associated with a various engine accessories, such as an air conditioning system, a power steering system. In the shown embodiment, the load sensor 29 may include an ON/OFF switch 26 for a compressor 40 of the air conditioner system. The compressor 40 is associated with a electromagnetic clutch 40a which connects and disconnects the compressor to and from an engine output shaft for selectively driving the compressor. The electromagnetic clutch 40a is connected to a constant voltage source Vacc via a relay 39. The relay 39 is turned ON in response to a demand for chilled air in the air conditioning system to energize the electromagnetic clutch 40a for connecting the compressor 40 to the engine output shaft. Therefore, when the compressor 40 is connected, the load on the engine 1 is increased. In the recent and sophisticated air conditioner systems in the automotive vehicle, demand for child air for supplying cool air to the vehicular cabin is output through the control unit 41 depending upon the temperature difference between the air temperature in the vehicular cabin, the atmospheric air temperature, insolation and other environmental condition indicative parameters. However, the invention is not limited to such sophisticated automatic air conditioner system but to include air conditioner systems which requires manual operation for commanding ON and OFF of the relay 39.

The transmission neutral position switch 25 is associated with an automatic power transmission unit (not shown) for detecting a neutral (N) range position or a park (P) range position of a transmission gear selector (not shown) to turn ON. The sophisticated automatic power transmission employed in the shown embodiment is associated with a mciroprocessor based automatic transmission (A/T) control unit 42 which will be hereafter referred to as "A/T control unit". The A/T control unit 42 is connected to shift control mechanism including shifting solenoids 45 and 46 for performing varying automatic power transmission shift position control valve for selectively setting the automatic transmission range positions.

The engine coolant temperature sensor 27 is disposed within an engine cooling water jacket in the engine cylinder block to monitor the temperature of an engine coolant and to produce an engine coolant temperature indicative signal Tw.

A traction control unit 43 which will be hereafter TCS control unit" is connected to the TCS motor control unit 15 to feed a traction control signal indicative of demand for the TCS throttle valve angular position. On the other hand, the TCS control unit 43 receives a TCS throttle valve actual angular position indicative data represented by the TCS throttle valve angle position indicative signal $TVO_2$ from the throttle angle sensor 22 for feedback controlling the TCS motor control unit 15 so that the latter may control the TCS motor 14 to place the TCS throttle valve 12 at the demanded angular position. The TCS control unit 43 is also connected to wheel speed sensors 31, 32, 33 and 34 for monitoring wheel speeds of respective front-right, front-left, rear-right and rear-left wheels. In the shown embodiment, the rear wheels are driving wheels connected to the engine output shaft via a power train including the automatic power transmission unit, a differential gear unit and final drive shafts and so forth. On the other hand, the front wheels are driven wheel which are free from engine driving torque and thus freely rotate according to vehicle travel. The wheel speed sensors 31 and 32 monitor the rotation speed of the front wheels as the driven wheels to produce a driven wheel speed indicative signals. Similarly, the wheel speed sensors 33 and 34 monitor rotation speed of the rear wheels as the driving wheels to produce driving wheel speed indicative signals. Since the driven wheel speed as monitored by the wheel speed sensors 31 and 32 is simply determined by the traveling speed of the vehicular body, the driven wheel speed signals produced by the wheel speed sensors 31 and 32 are taken as vehicular body traveling speed representative data in the traction control operation.

The TCS control unit 43 is also connected to a brake switch 36 which is associated with a manually operable brake element 35, such as a brake pedal. The brake switch 36 is turned on by manual operation of the brake element for application of vehicular brake for deceleration of the vehicle to input a HIGH level braking state indicative signal. In the shown embodiment, the TCS control unit 43 is also connected to a manual selector switch 37 which is manually operably for activating and deactivating the traction control. Furthermore, the TCS control unit 43 is connected to indicator lamps 47 and 48. The indicator lamp 47 is turned ON when the traction control is active and the indicator lamp 48 is turned ON when the traction control is not active. The indicator lamp 48 also serves as fail indicator to be turned ON in response to failure of the traction control system. The TCS control unit 43 is also connected to a brake system 46 which adjusts hydraulic braking pressure to be distributed to respective wheel cylinders for adjusting wheel speed of the driving wheels.

With the construction set for above, the TCS control unit 43 generally performs traction control for reducing wheel slippage both in acceleration and deceleration states of the vehicle. Therefore, the TCS control unit is practically operative for adjusting engine driving torque to be distributed to respective driving wheels and for adjusting hydraulic pressure to be distributed in respective wheel cylinders of hydraulic brake system. The operation of the traction control system will be briefly discussed herebelow.

In general, the TCS control unit 43 monitors the wheel slippage based on a difference of the wheel speeds between a driving wheel and a driven wheel. In the acceleration state, the wheel speed of the driving wheel tends to become higher than that of the driven wheel when wheel slip occurs. Therefore, in traction control in the acceleration state, the wheel speed of the driven wheel is generally taken as vehicle the body speed representative parameter. Therefore, the ratio of the wheel speed difference between the driving wheel and driven wheel versus the wheel speed of the driven speed represents the wheel slippage. In the shown embodiment, as the driven wheel speed, an average wheel speed of front-right and front-left wheels is used. Depending upon the wheel speed difference between the average wheel speed of the driven wheel and the wheel speed of the driving wheels, acceleration state traction control is performed in three mutually different modes.

Figure 2:
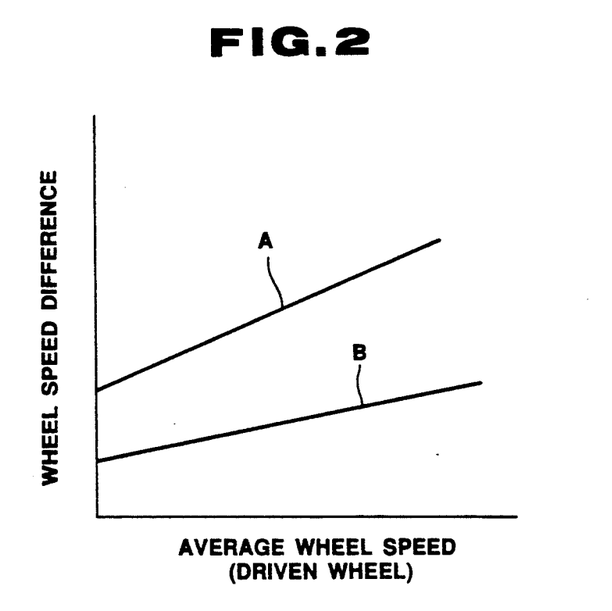
FIG. 2 is a chart showing the relationship between wheel slippage and modes of traction control.

As shown in FIG. 2, the TCS throttle valve is maintained in a fully opened position while the wheel speed difference is smaller than or equal to a first criteria as represented by a line A. On the other hand, if the wheel speed difference is greater than the first criteria and smaller than or equal to a second criteria as represented by a line B, the TCS throttle valve 12 is maintained at a limited or restricted open angle position. When the wheel speed difference is greater than the second criteria, the TCS throttle valve 12 is operated to the fully closed position. Therefore, in the acceleration state traction control, the TCS control unit 43 derives a torque control signal having a value representative of the desired TCS throttle valve angular position. The value of the torque control signal value is variable between a minimum value representative of the fully open position of the TCS throttle value 12 and a maximum value representative of the fully closed position of the TCS throttle valve. The torque control signal value varies between the minimum value and the maximum value when the wheel speed difference is smaller than or equal to the second criteria and greater than the first criteria.

According to torque control signal, the TCS motor control unit 15 drives the TCS motor 14 to place the TCS throttle valve 12 at the demanded angular position. When the TCS throttle valve 12 is adjusted to the angular position, the TCS motor control unit 15 receives the TCS throttle valve angle position indicative signal $TVO_2$ as the feedback signal. The TCS motor control unit 15 continues operation to drive the TCS motor 14 until the TCS throttle valve angle position indicative signal value becomes equal to the torque control signal value. On the hand, the TCS motor control unit 15 feeds the TCS throttle valve angle position data to the TCS control unit 43 as feedback data.

Figure 3:
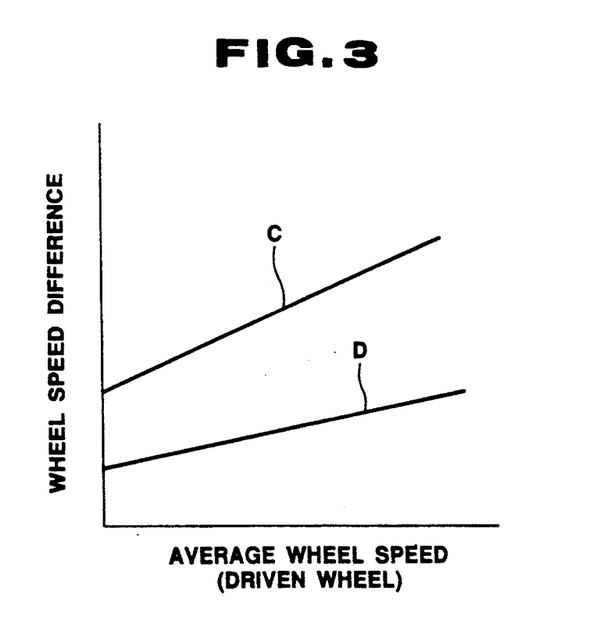
FIG. 3 is a chart showing the relationship between wheel slippage and modes of anti-skid brake control.

On the other hand, the TCS control unit 43 activates the brake control unit 46 when the wheel speeds of the driving wheels are different from each other due to a difference of traction between rear-right and rear-left wheels. The brake system 46 applies the hydraulic automotive braking force for adjusting wheel speeds of the driving wheels independently of each other. The TCS control unit 43 performs brake control operation in three mutually different modes selected on the basis of the wheel speed difference between the driving wheel and the average wheel speed of the driven wheels in relation to the average wheel speed of the driven wheels. Namely, as seen from FIG. 3, when the wheel speed difference is smaller than or equal to a first criteria as represented by line C in FIG. 3, the brake system is maintained at the normal state. When the wheel speed difference is greater than the first criteria and smaller than or equal to a second criteria as represented by line D in FIG. 3, the brake system is operated to generate limited braking force for decelerating the wheel speed. As set forth, the magnitudes of braking force applied to the rear-right and rear-left wheels are controlled independently of each other. Therefore, the wheel speed of the rear-right and rear-left wheels can be adjusted to be equal to each other.

The brake control set forth above is given higher priority than the acceleration state traction control. Therefore, the brake control is initiated in advance of the acceleration state traction control, and the acceleration state traction control for adjusting the engine output is performed only when the wheel slippage cannot be successfully suppressed solely by the brake control.

The A/T control unit 42 receives the primary throttle valve angle position indicative signal $TVO_1$ and the vehicle speed indicative signal VSP. The A/T control unit 42 selects an optimum gear ratio on the basis of the primary throttle valve angle position indicative signal $TVO_1$ and the vehicle speed indicative signal VSP in a manner that is per se, well known and operates the shift control solenoids 44 and 45 for performing the automatic transmission gear positions.

The control unit 41 performs the control operation for controlling the engine driving the operation and operating of engine accessories, such as the air conditioner. In the shown embodiment, the control unit 41 controls fuel supply, a spark ignition timing, an auxiliary air flow rate for optimizing the engine operation. Also, the control unit 41 controls ON and OFF of the relay 39 for minimizing additional load applied the engine due to operation of the air conditioner.

The control operations to be performed by the control unit 41 will be discussed herebelow with reference to FIGS. 4 to 8. These routines are executed at respectively given timing in synchronism with the engine revolution and at a given fixed interval.

Figure 4:
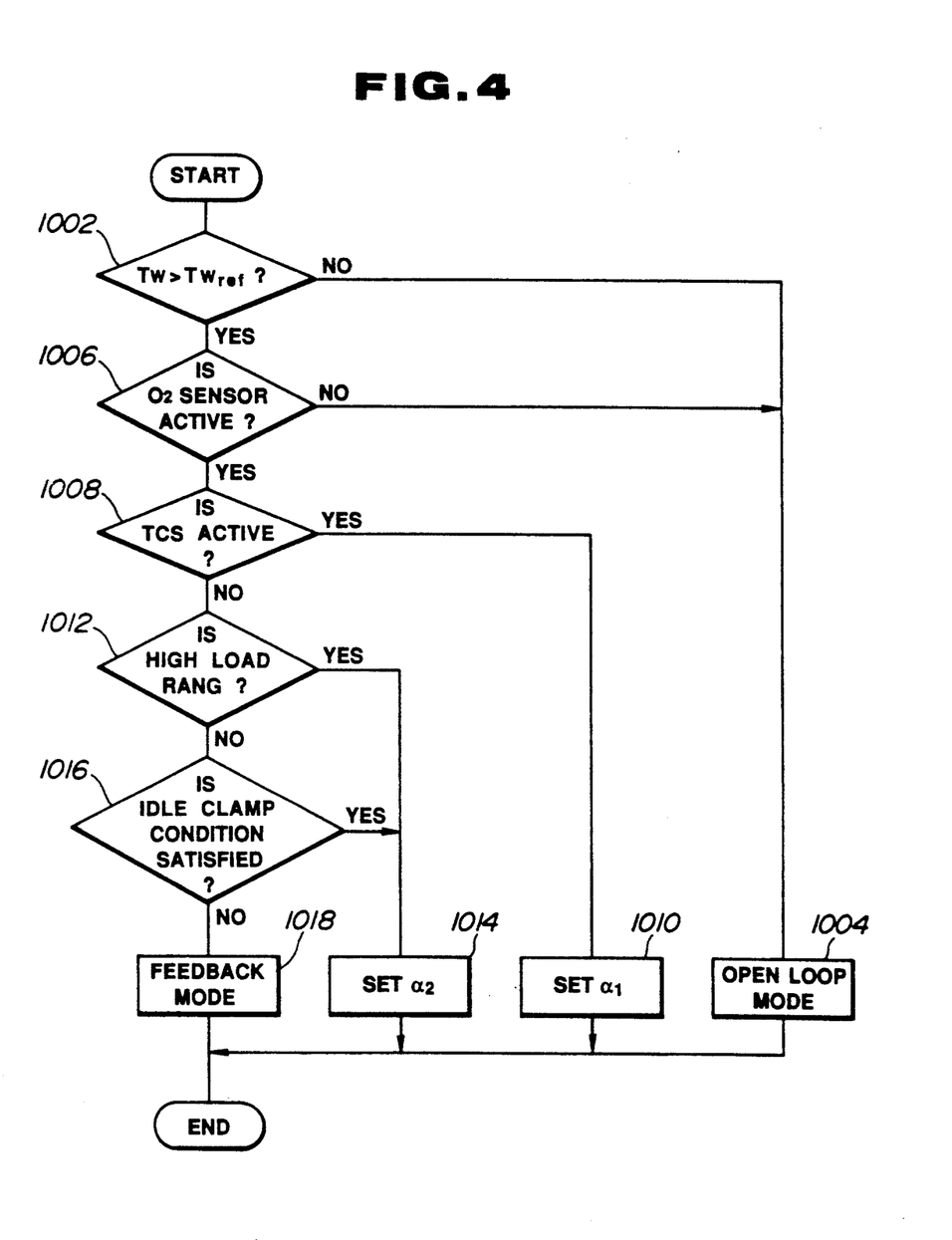
FIG. 4 is a flowchart of an air/fuel ratio control routine to be executed by a control unit in the control system of FIG. 1.

FIG. 4 is a routine for controlling the air/fuel ratio of the air/fuel mixture to be introduced into the engine combustion chamber. In general, air/fuel ratio control is performed in combination with fuel injection control, in which fuel injection amount is derived on the basis of an engine speed N and an engine load Q and corrected by correction coefficients derived in terms of various correction factors. The engine speed N can be derived on the basis of the pulse interval or frequency of the crank reference signal $\theta_{ref}$ or the crank position signal $\theta_{pos}$ in a process that is, per se, well known process. On the other hand, the intake air flow rate indicative signal value Qa is generally taken as the engine load Q indicative data. The accelerator angular variation ratio as derived from the primary throttle valve angle position indicative signal $TVO_1$, the engine coolant temperature indicative signal value Tw are typical correction factors for deriving the fuel injection amount. The oxygen concentration indicative signal which varies between a HIGH level indicative of rich mixture and a LOW level indicative of lean mixture. The oxygen concentration indicative signal is therefore one of the important correction factor for correcting the fuel injection amount in view of air/fuel ratio. Therefore, the air/fuel ratio control is performed as a part of the fuel injection control.

The air/fuel ratio control is normally performed in two mutually distinct modes, i.e. CLOSED LOOP or FEEDBACK mode and OPEN LOOP mode. In the FEEDBACK mode operation, the correction coefficient for correcting the fuel injection amount is derived on the basis of the oxygen concentration indicative signal Vs as the feedback signal. On the other hand, in the OPEN LOOP mode operation, the oxygen concentration dependent correction coefficient for correcting the fuel injection amount is derived at a fixed value derived on the basis of the engine coolant temperature and so forth.

In the process illustrated in FIG. 4, the engine coolant temperature indicative signal value Tw is read out at a step 1002. At the step 1002, the engine coolant temperature indicative signal value Tw is compared with a predetermined engine coolant temperature threshold $Tw_{ref}$. This step is required since the FEEDBACK mode air/fuel ratio control cannot be performed in the cold engine state in which the engine coolant temperature is lower than a given cold engine criteria represented by the engine coolant temperature threshold. Therefore, if the engine coolant temperature signal value Tw is smaller than or equal to the engine coolant temperature threshold $Tw_{ref}$, OPEN LOOP mode control is ordered at a step 1004. In the OPEN LOOP mode air/fuel ratio control operation, the correction coefficient for correcting the fuel injection amount is derived simply depending upon the engine coolant temperature Tw.

When the engine coolant temperature indicative signal value Tw as checked at the step 1002 is greater than the engine coolant temperature threshold $Tw_{ref}$, condition of the oxygen sensor 23 is checked whether the oxygen sensor is active or not at a step 1006. Since the oxygen sensor 23 is unstable at a temperature lower than a predetermined threshold, check at the step 1006 is performed by checking the temperature of the oxygen sensor. If the oxygen sensor 23 as checked at the step 1006 is not active, the process goes to the step 1004 to order an OPEN LOOP mode.

When the oxygen sensor 23 as checked at the step 1006 is active, a check is performed to determine whether the TCS control system 43 is active to perform traction control, at a step 1008. In practice, the tCS control unit 43 outputs a TCS active state indicative signal while it is in operation. Therefore, check at the step 1008 is performed by checking the TCS active state indicative signal. If TCS active state indicative signal is detected as checked at the step 1008 and thus judgement is made that the TCS control unit is active, the air/fuel ratio dependent correction coefficient for correcting the fuel injection amount is set at a fixed value $a_1$, e.g. 0.95, at a step 1010.

On the other hand, when the TCS active state indicative signal is not detected as checked at the step 1008, a check is performed to determine whether the engine operates in a high engine load range, at a step 1012. Load on the engine is practically checked by checking the primary throttle valve open angle. Namely, when the primary throttle valve open angle is greater than a predetermined high engine load criterion, the high engine load range condition is detected. When the high engine load range is detected as checked at the step 1012, the air/fuel ratio dependent correction coefficient for correcting the fuel injection amount is set at a fixed value $a_2$, e.g. 1.0, at a step 1014. On the other hand, when the engine driving condition as checked at the step 1012 is not in a high engine load range, a check is performed to determine whether the engine driving condition satisfies a predetermined idle clamp condition, at a step 1016.

It should be appreciated that the idle clamp condition is satisfied when the HIGH level neutral signal of the transmission neutral switch 25 is detected, whereby the engine idling condition is detected, and the idling condition is maintained for predetermined cycles of feedback control, e.g. 4 cycles. Average value of the correction coefficient derived over the predetermined feedback cycles is clamped as a fixed value.

When the engine driving condition satisfying the idle clamp condition is detected as checked at the step 1016, the process goes to the step 1014 to set the correction coefficient at the fixed value $a_2$ as set forth above. On the other hand, when the engine driving condition as checked at the step 1016 does not satisfy the idle clamp condition, FEEDBACK mode is ordered at a step 1018. In the FEEDBACK mode operation at the step 1018, the correction coefficient for correcting the fuel injection amount is derived on the basis of the oxygen concentration indicative signal value Vs.

As will be appreciated herefrom, according to the shown process of air/fuel ratio control, the air/fuel ratio dependent correction coefficient is set at a fixed value when the TCS control is active. Therefore, even when the TCS throttle valve 12 is driven to limit the air flow passage for reducing engine output torque, the fuel injection amount can be maintained at a satisfactorily stable state and may not become unacceptably fluctuated. Therefore, combustion in the engine combustion chamber can be maintained at a stable state so as not to substantially degrade drivability and emission control.

Figure 5:
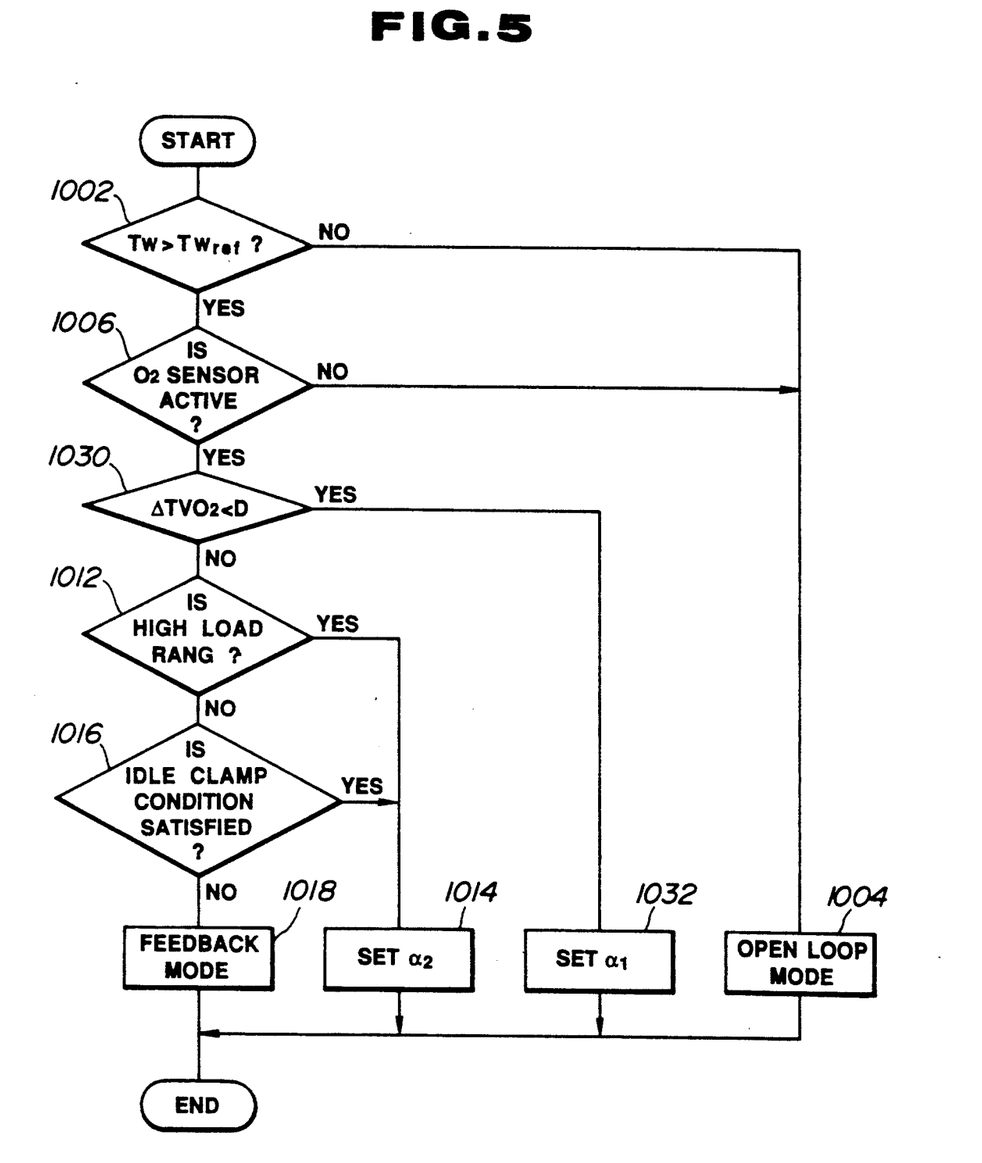
FIG. 5 is a flowchart of a modified air/fuel ratio control routine.

FIG. 5 shows a modification of the air/fuel ratio control routine. As seen from FIG. 5, only steps 1008 and 1010 are modified from the routine of FIG. 4. In the modified routine, in the step 1030 which replaces the step 1008 in the former routine of FIG. 4, a check is performed to determined whether a TCS throttle valve angular displacement $\Delta TVO_2$ is smaller than a predetermined value 0. The value of the TCS throttle valve angular displacement $\Delta TVO_2$ increases the positive value when the TCS throttle value open angle is increasing and decreases from 0 when the TCS throttle valve open angle is decreasing.

When the TCS throttle valve angular displacement $\Delta TVO_2$ is smaller than 0 as checked at the step 1030, judgement is made that the TCS control is active for reducing the engine output torque. Then, at a step 1032, the air/fuel ratio dependent correction coefficient for correcting the fuel injection amount is set at a fixed value $a_1'$. The fixed value $a_1'$ is smaller than the fixed value $a_1$ to be set at the step 1010.

Figure 6:
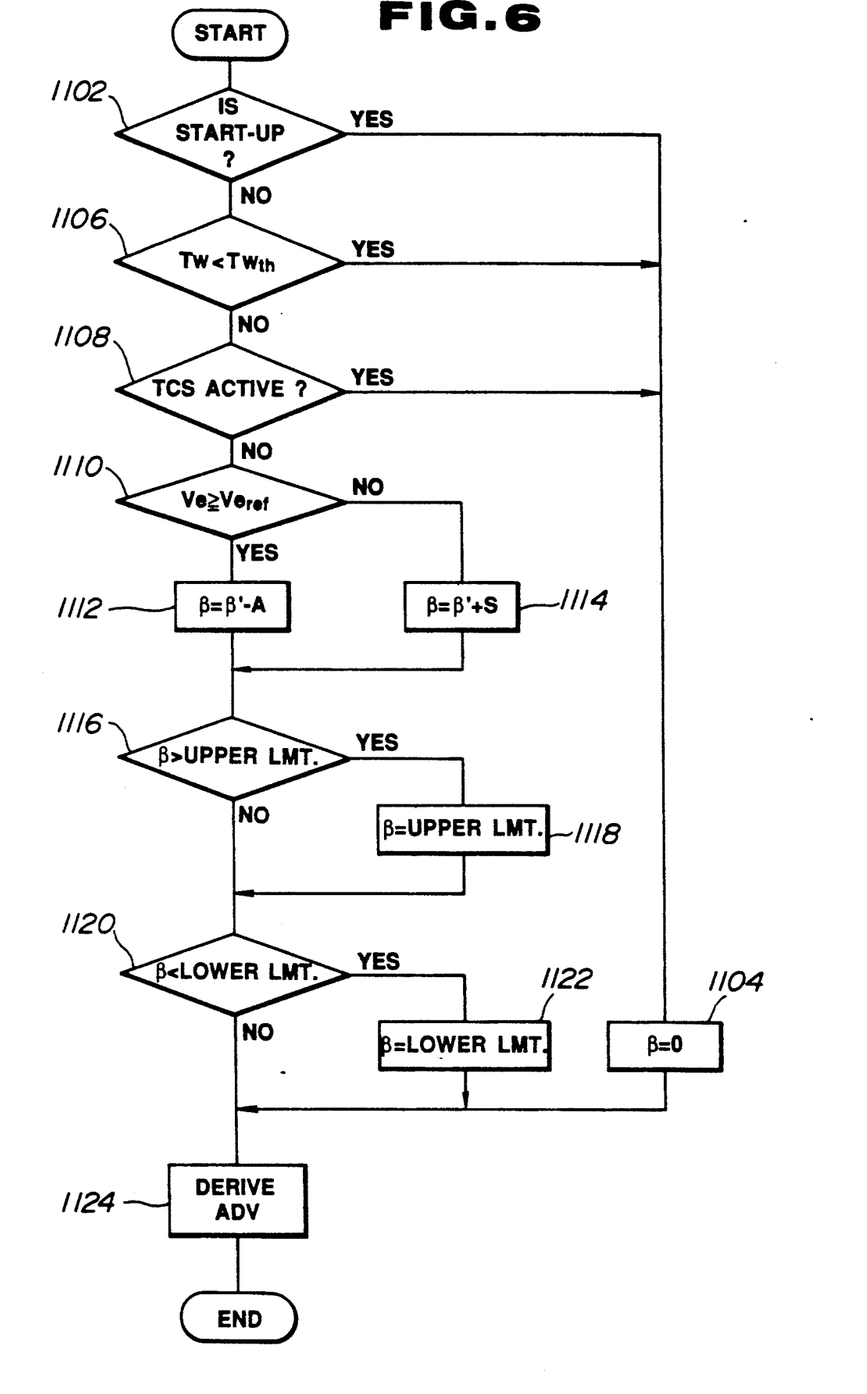
FIG. 6 is a flowchart of a spark ignition timing control routine to be executed by the control unit in the control system of FIG. 1.

FIG. 6 shows a spark ignition control routine including knock suppressive spark advance control. Generally, a basic spark ignition timing $ADV_0$ is determined on the basis of the engine speed N and the basic fuel injection amount $T_p (= K \times Q/N)$ and is corrected by a correction coefficient determined on the basis of various correction parameters, such as engine knocking condition, the engine coolant temperature and so forth.

In the process shown in FIG. 6, a check is performed to determine whether or not the engine is in a start-up state at a step 1102. When the engine start-up state is detected as checked at the step 1102, the knock suppressing spark advance retard value $\beta$ is set at zero (0) at a step 1104. On the other hand, when the engine driving condition as checked at the step 1002 is not the start-up state, the engine coolant temperature indicative signal value Tw is read out at a step 1106. The engine coolant temperature indicative signal value Tw is compared with a predetermined threshold $Tw_{th}$ at the step 1106. If the engine coolant temperature indicative signal value Tw is smaller than the threshold value $Tw_{th}$ as checked at the step 1106, the process goes to the step 1104. When the engine coolant temperature indicative signal value Tw as checked at the step 1106 is greater than or equal to the threshold value $Tw_{th}$, a check is performed to determine whether the TCS control unit is active for performing traction control, at a step 1108. Similarly to the process in the routine of FIG. 4, a check at the step 1108 is performed by checking the TCS active state indicative signal level. If the TCS active state indicative signal level is HIGH, judgement is made that the TCS control unit 43 is active. If so, the process goes to the step 1104. When the TCS active state indicative signal level is LOW as checked at the step 1108, the knock indicative signal Ve is read and compared with a predetermined engine knocking threshold $Ve_{ref}$ at a step 1110. The engine knocking threshold $Ve_{ref}$ is determined on the basis of a known engine knocking level K which is derived based the intake air flow rate Qa and the engine speed N. As is well known, the engine driving performance becomes optimum at the light knock condition. Therefore, the small magnitude of engine knocking is acceptable in view of the engine performance. On the other hand, heavy knocking will cause damage in the engine. The acceptable level of the engine knocking is variable depending upon the engine load condition as represented by the intake air flow rate and the engine speed. Therefore, the engine knocking level K may be set at a threshold between acceptable and unacceptable enging knocking magnitude.

If the knock indicative signal value Ve is greater than or equal to the engine knocking threshold $Ve_{ref}$ as checked at the step 1110, the knock suppressive correction coefficient $\beta$ is derived at a step 1112. The knock suppressive correction coefficient $\beta$ is derived by subtracting a predetermined retarding magnitude indicative value A from a knock suppressive correction coefficient $\beta'$ derived in the former execution cycle. On the other hand, when the knock indicative signal value Ve is smaller than the engine knocking threshold $Ve_{ref}$, the knock suppressive correction coefficient is modified in the advancing direction to advance the spark advance, at a step 1114. Practically, the spark advance is advanced by adding a predetermined advancing magnitude indicative value S which is much smaller than the retarding magnitude indicative value A to the knock suppressive correction coefficient $\beta'$ derived in the former execution cycle.

In the shown embodiment, the spark advance retarding magnitude indicative value A is set at 1° and the advancing magnitude indicative value S is set at 0.1°. With this, spark advance can be quickly retarded in response to engine knocking at the substantial magnitude and moderate advance of spark advance so that spark advance can be maintained at slight knock condition as long as possible.

At a step 1116, the knock suppressive correction coefficient $\beta$ is compared with an upper limit value so as to check whether the knock suppressive correction coefficient represents excessive advancing magnitude of the spark advance. When the correction coefficient $\beta$ as checked at the step 1116 is greater than the upper limit value, the correction coefficient is set at the upper limit value at a step 1118. On the other hand, when the knock suppressive correction coefficient $\beta$ is smaller than or equal to the upper limit value as checked at the step 1116 or after the process in the step 1118, the knock suppressive correction coefficient $\beta$ is compared with a lower limit value which is representative of a criterion of excessively retarding magnitude of spark advance, at a step 1120. If the correction coefficient $\beta$ is smaller than the lower limit value as checked at the step 1120, the correction coefficient is set at the lower limit value at the step 1122.

At a step 1124, spark advance ADV is calculated through a known process utilizing various correction parameters including the knock suppressive correction coefficient $\beta$.

Figure 7:
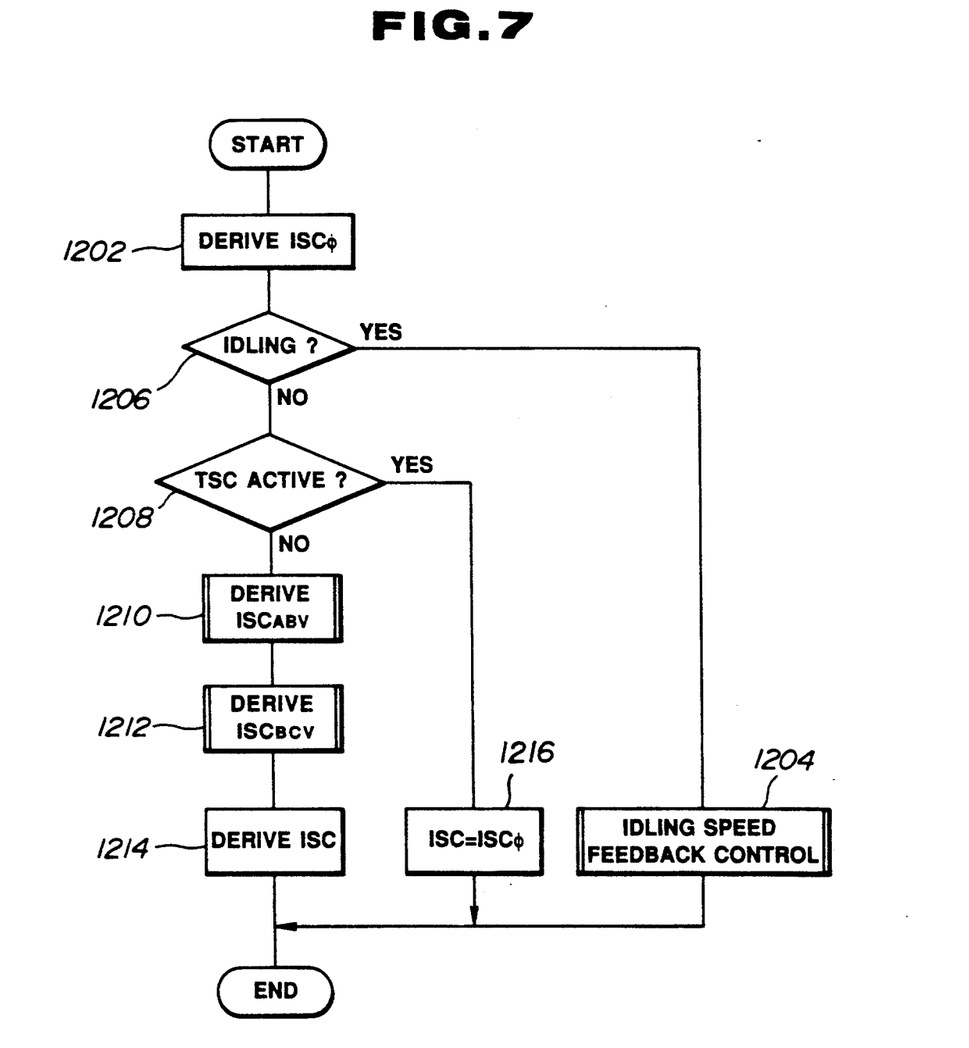
FIG. 7 is a flowchart of an auxiliary air control routine to be executed by the control unit in the control system of FIG. 1.

FIG. 7 shows a routine for controlling an auxiliary air flow rate through the by-pass air passage 5. The auxiliary air control valve 6 employed in the shown embodiment is designed to control the air flow rate therethrough by a auxiliary air control signal which is pulse signal having duty cycle representative of the desired auxiliary air flow rate. In general, the derivation of the auxiliary air flow rate and the auxiliary air control signal has been illustrated in the U.S. Pat. Nos. 4,365,599, 4,406,261, 4,345,557, 4,402,289, 4,406,262 and 4,344,398, all owned by the common owner to the present invention. The disclosure of these U.S. Patents are herein incorporated by reference for the sake of disclosure.

In the shown process, the basic duty cycle $ISC\phi$ of the auxiliary air control signal is derived according to the following equation, at a step 1202:

$$ISC\phi = ISC_{TW} + ISC_{AC} + ISC_{PWS} \ldots$$

where $ISC_{TW}$ is a value derived on the engine coolant temperature Tw and representative of the engine coolant temperature dependent characteristics of the auxiliary air $ISC_{AC}$ is a correction value depending upon the air condition operating condition (which is to be added while the air conditioner switch is ON or the compressor is held in operation) and $ISC_{PWS}$ is a correction value depending upon the power steering operating system (which is to be added while the power steering system is active).

At a step 1204, a check is performed to determined whether the engine is in an idling condition. The engine idling condition is checked by the primary throttle angle position indicative signal $TVO_1$ input from the primary throttle angle sensor 21 or by the HIGH level transmission neutral position indicative signal from the transmission neutral switch 25. Namely, when the transmission selector position is set at neutral range position to cause a HIGH level transmission neutral position indicative signal, and the primary throttle valve is held at fully closed or approximately fully closed position, judgement can be made that the engine is in an idling condition. If the engine idling condition is detected as checked at the step 1204, a target engine speed $N_M$ is derived depending upon the condition of the air conditioner system, the power steering system and so forth, at a step 1204. At the step 1204, the duty cycle ISC of the auxiliary air control signal is derived so that the engine idling speed can be adjusted to the target engine speed $N_M$. Then, feedback control is performed for maintaining the engine idling speed at the target speed $N_M$.

When the engine is not in the idling condition as checked at the step 1206, a check is performed to determine whether the TCS control unit 43 is active to perform the traction control, at a step 1208. When the TCS control unit 43 is active and thus the traction control is ON, the duty cycle ISC of the auxiliary air control signal is set at the basic duty cycle ISC$\phi$ derived at the step 1202, at a step 1216.

Though the shown embodiment sets the duty cycle of the auxiliary air control signal at the initially derived basic duty cycle inn response to active state of the traction control, it is possible to utilize a predetermined fixed value in place of the basic duty cycle.

When the TCS control unit 43 is not active as checked at the step 1206, an AB valve correction value ISC$_{ABV}$ is derived by table look-up at a step 1210. The AB valve (not clearly shown) is designed to be opened in response to an abrupt deceleration which is an abrupt shift of the primary throttle valve from the open position to the fully closed position. Such activity of the primary throttle valve tends to cause increasing boost pressure due to the presence intake air maintained in the intake manifold. Excessive boost pressure tends to cause a change of combustioning condition in the combustion chamber and increases the amount of HC. At a step 1212, a BC valve correction value ISC$_{BCV}$ is derived a table look-up. The BC valve (not shown) is designed to be open to introduce atmospheric air in response to the engine deceleration from the high or middle range engine speed. During an engine deceleration state, the vacuum pressure tends to become excessively higher. Therefore, the BC valve is set at a predetermined magnitude of vacuum pressure, e.g. $-620$ mm/Hg, to introduce vacuum pressure to prevent the intake vacuum from becoming excessive.

At a step 1214, the duty cycle ISC of the auxiliary air control signal is derived on the basis of the basic duty cycle ISC$\phi$ derived at the step 1202, the AB valve correction value ISC$_{ABV}$, ISC$_{BCV}$ and so forth.

Figure 8:
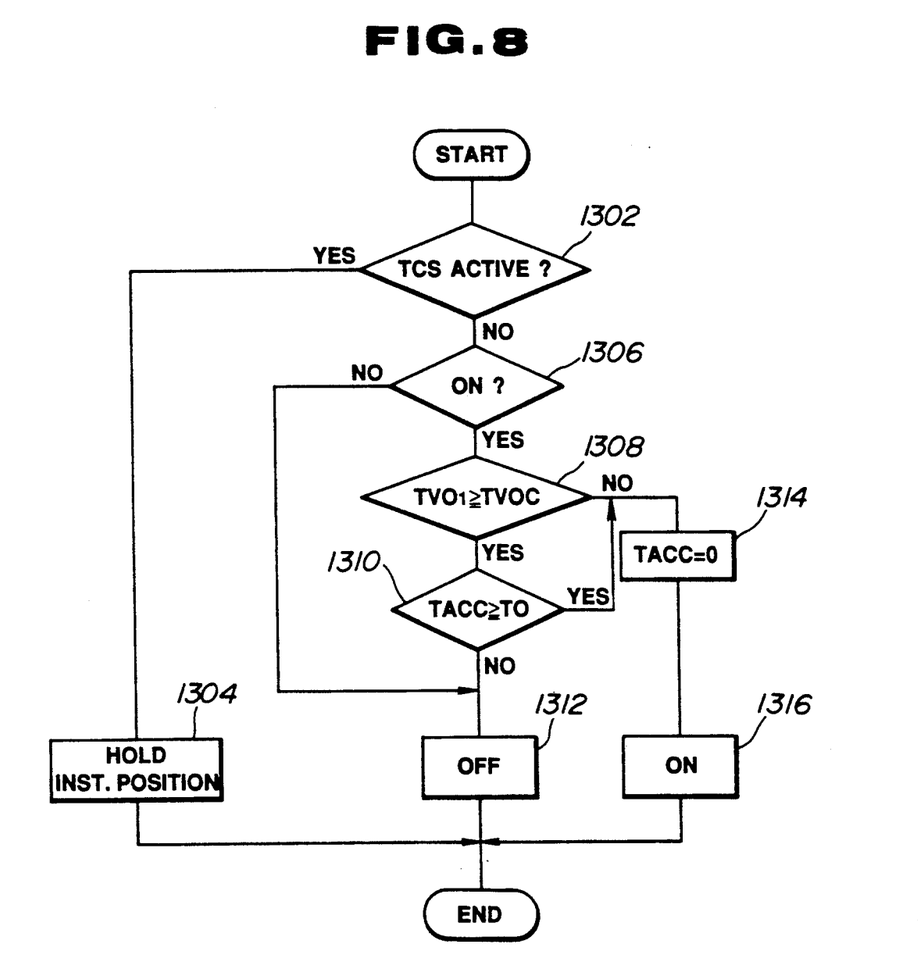
FIG. 8 is a flowchart of an air conditioner control routine to be executed by the control unit in the control system of FIG. 1.

FIG. 8 shows a routine for controlling operation of the air conditioner system. At a step 1302, a check is performed to determined whether the TCS control unit 43 is active. If the TCS control unit 43 as checked at the step 1302 is active, switching of the relay coil of the relay 39 of the air conditioner system is disabled. Therefore, the relay 39 is held at the condition immediately after the active condition of the TCS control unit is detected, at a step 1304. This step is intended to prevent the engine load from fluctuating by switching relay 39 ON and OFF to cause connecting and disconnecting of the electromagnetic clutch 40a of the compressor 40 of the air conditioner system. On the other hand, when the TCS control unit 43 is not active as checked at the step 1302, the position of an air conditioner switch (not shown) is checked at a step 1306. The air conditioner switch may be turned ON when the air in the vehicular cabin is cooled or dehumidification of the cabin air is required. Therefore, the ON state of the air conditioner switch represents a demand for an operation of the air conditioner, including driving of the compressor 40. On the other hand, the OFF state of the air conditioner switch represents a demand to hold the air conditioner system inoperative. In the shown embodiment, the air conditioner system is designed to automatically control power supply for the relay 39 to energize and deenergize the relay according to the engine driving condition. Namely, in the shown embodiment, the power supply is terminated during the engine acceleration state so that the driving of compressor may not serve as resistance for the engine acceleration.

When the air conditioner switch is ON as checked at the step 1306, the primary throttle valve angle position indicative signal value TVO$_1$ is read and compared with a predetermined engine accelerating state threshold TVOC at a step 1308. If the primary throttle valve angle position indicative signal value TVO$_1$ is greater than or equal to the engine accelerating state threshold TVOC, judgement is made that the engine is in an accelerating state which requires turning OFF of the relay 39. Then, at a step 1310, an acceleration state timer TACC which is started upon initiation of cutting OFF of power supply for the relay 39 in response to the engine acceleration and measures an elapsed period, is compared with a timer threshold T$_0$. If the acceleration state timer value TACC is smaller than the timer threshold T$_0$ as checked at the step 1310, power supply for the relay 39 is cut for maintaining the electromagnetic clutch 40a of the compressor 40 deenergized at a step 1312.

On the other hand, when the primary throttle valve angle position indicative signal value TVO$_1$ is smaller than the engine acceleration state threshold TVOC as checked at the step 1308, or when the acceleration state timer value TACC is greater than or equal to the timer threshold T$_0$ as checked at the step 1310, the acceleration state timer value TACC is cleared to zero at a step 1314. Then, power is supplied for the relay 39 to maintain driving of the compressor 40 by connecting the compressor to the engine output shaft via the electromagnetic clutch 40a.

While the present invention has been disclosed in terms of the preferred embodiment in order to facilitate better understanding of the invention, it should be appreciated that the invention can be embodied in various ways without departing from the principles of the invention. Therefore, the invention should be understood to include all possible embodiments and modifications to the shown embodiments which can be embodied without departing from the principle of the invention set out in the appended claims.

For example, though the shown embodiment varies modes of control of the air/fuel ratio, spark ignition timing and auxiliary air flow rate for controlling engine operation depending upon an active state and an inactive state of the traction control, the various mode control operation in terms of the state of the traction control may be applicable not only for the specified controls but also for any relevant engine controls such as exhaust gas recirculation control, fuel injection control and so forth.

What is claimed is:

1. In an automotive vehicle having a manually operable accelerator and driving wheels, a control system comprising:

an internal combustion engine having a combustion chamber;

an air induction system for introducing an intake air into said combustion chamber, said air induction system having disposed therein a first throttle valve connected to the manually operable accelerator, the angular position of said first throttle valve depending upon an operation magnitude of the accelerator;

sensor means for monitoring control parameters including an oxygen concentration in an exhaust gas produced by said engine and for producing control parameter indicative signals indicative of said control parameters monitored;

a fuel supply system, connected to said air induction system, for supplying a fuel to said air induction system, said fuel supply system including means for varying a fuel supply amount of said fuel supplied to said air induction system;

a traction control system detecting wheel slippage of the driving wheels and adjusting the distribution of driving torque for the driving wheels when the magnitude of said wheel slippage is greater than a predetermined wheel slippage threshold, said traction control system including a second throttle valve disposed in said air induction system in series with said first throttle valve, said traction control system having an inactive state in which said second throttle valve is positioned at a fully open position and an active state, said traction control system being normally in said inactive state and being switched into said active state when the magnitude of said wheel slippage is greater than a predetermined wheel slippage threshold, said traction control system decreasing an opening angle of said second throttle valve for reducing engine output torque depending upon the magnitude of said wheel slippage when said traction control system is in said active state thereof; and a controller means for receiving said control parameter indicative signals and for controlling said fuel supply amount varying means on the basis of said control parameter indicative signals, said controller means deriving said fuel supply amount for maintaining an air/fuel ratio of an air/fuel mixture to be introduced into said combustion chamber at a stoichiometric value on the basis of said oxygen concentration in a first control mode which is selected when said traction control system is in said inactive state, and said controller means deriving said fuel supply amount irrespective of said oxygen concentration in a second control mode which is selected when said traction control system is in said active state;

wherein said sensor means monitors an engine speed and an engine load as basic control parameters, and said controller means derives a basic fuel supply amount on the basis of the engine speed and engine load detected by said sensor means and modifies said basic fuel supply amount by a correction coefficient derived on the basis of said oxygen concentration in said first mode, and wherein said controller means modifies said basic fuel supply amount by a fixed value of a correction coefficient which is set irrespective of said oxygen concentration in said second mode.

2. A control system as set forth in claim 1, wherein said traction control system produces an active state indicative signal when it is active, and said controller means is responsive to said active state indicative signal to switch said control mode from said first mode to said second mode.

3. A control system as set forth in claim 1, wherein said controller means operates in a feedback mode and an open loop mode within said first mode, wherein, in said feedback mode, said correction coefficient is derived depending upon said oxygen concentration, and in said open loop mode, said correction coefficient is set at a fixed value irrespective of said oxygen concentration, and wherein said controller means selects said feedback mode when the engine driving condition satisfies a predetermined feedback condition.

4. In an automotive vehicle having a manually operable accelerator and driving wheels, a control system comprising:

an internal combustion engine having a combustion chamber;

an air induction system for introducing an intake air into said combustion chamber, said air induction system having disposed therein a first throttle valve connected to the manually operable accelerator, the angular position of said first throttle valve depending upon an operation magnitude of said accelerator;

sensor means for monitoring control parameters including an engine knocking magnitude and for producing control parameter indicative signals indicative of said monitored control parameters;

a fuel supply system, connected to said air induction system, for supplying a fuel to said air induction system;

a spark ignition system, communicating with said combustion chamber, for initiating a spark in said combustion chamber, said spark ignition system including means for varying a spark ignition timing;

a traction control system detecting wheel slippage of the driving wheels and adjusting the distribution of driving torque for the driving wheels when the magnitude of said wheel slippage is greater than a predetermined wheel slippage threshold, said traction control system including a second throttle valve disposed in said air induction system in series with said first throttle valve, said traction control system having an inactive state in which said second throttle valve is positioned at a fully open position and an active state, said traction control system being normally in said inactive state and switched into said active state when the magnitude of said wheel slippage is greater than a predetermined wheel slippage threshold, said traction control system decreasing an opening angle of said second throttle valve for reducing engine output torque depending upon the magnitude of said wheel slippage when said traction control system is in said active state thereof; and a controller means for receiving said control parameter indicative signals for controlling said spark ignition timing varying means on the basis of said control parameter indicative signals, said controller means deriving said spark ignition timing on the basis of said engine knocking magnitude for suppressing engine knocking in a first control mode which is selected when said traction control system is in said inactive state, and said controller means deriving said spark ignition timing irrespective of said engine knocking magnitude in a second control mode which is selected when said traction control system is in said active state;

wherein said controller means derives, in said first mode, a basic spark advance on the basis of an engine speed and an engine load monitored by said sensor means, and derives a spark advance on the basis of said basic spark advance and a correction value derived on the basis of correction factors monitored by said sensor means, wherein said controller means modifies said correction value for advancing said spark advance at a predetermined first magnitude while said engine knocking magnitude is smaller than a predetermined knocking threshold, and modifies said correction value for retarding spark advance in a second magnitude when said engine knocking magnitude is greater than or equal to said knocking threshold, and wherein said controller means derives, in said second mode, a basic spark advance on the basis of the engine speed and the engine load monitored by said sensor means and derives a spark advance on the basis of said basic spark advance and a correction value derived on the basis of correction factors monitored by said sensor means without modifying said correction value based on said engine knocking magnitude.

5. An auxiliary air control system for an automotive internal combustion engine, comprising:
  an air induction system for introducing an intake air and a controlled amount of fuel into an engine combustion chamber, in which is disposed a first throttle valve connected to a manually operable accelerator to be controlled, the angular position of which depending upon an operation magnitude of said accelerator;
  a fuel supply means, associated with said induction system, for supplying controlled amount of fuel to said induction system;
  an auxiliary air induction system including a by-pass passage by-passing said first throttle valve, said auxiliary air induction system having an auxiliary air flow control valve for adjusting an air flow rate through said by-pass passage;
  a traction control system detecting wheel slippage and adjusting the distribution of driving torque for driving wheels when the magnitude of said wheel slippage is greater than a predetermined wheel slippage threshold;
  sensor means for monitoring driving parameters for producing control parameter indicative signals; and
  a controller means for receiving said control parameter indicative signals and for controlling said auxiliary air flow rate on the basis of said control parameter indicative signals, said controller means deriving a basic auxiliary air flow rate on the basis of preselected control parameters, said controller means modifying said basic auxiliary air flow rate on the basis of predetermined correction factors for controlling said auxiliary air flow control valve for adjusting said auxiliary air flow rate at the modified auxiliary air flow rate in a first control mode which is selected while said traction control system is held in an inactive state, and said controller means controlling said auxiliary air flow control valve for adjusting said auxiliary air flow rate at said basic auxiliary air flow rate in a second control mode which is selected when said traction control system is in an active state.

6. A control system as set forth in claim 5, wherein said traction control system produces an active state indicative signal when it is active, and said controller means is responsive to said active state indicative signal to switch said control mode from said first mode to said second mode.

7. A control system as set forth in claim 6, wherein said traction control system includes a second throttle valve disposed in said air induction system, said second throttle valve being normally positioned at a fully open position as long as said traction control is held in an inactive state, and the opening angle decreasing for reducing engine output torque depending upon the magnitude of wheel slippage while said traction control is active.

8. A control system as set forth in claim 5, wherein said controller means derives said basic auxiliary air flow rate based on an engine coolant temperature and a load condition on the engine, and modifies said basic auxiliary air flow rate on the basis of an engine deceleration state correction value derived on the basis of the speed of angular displacement of said first throttle valve and an initiation of engine deceleration.

9. A control system for an automotive engine driven device, comprising:
  an air induction system for introducing an intake air and a controlled amount of fuel into an engine combustion chamber, in which is disposed a first throttle valve associated with a manually operable accelerator to be controlled, the angular position of which depending upon operation magnitude of said accelerator;
  a fuel supply means, connected to said induction system, for supplying a controlled amount of fuel to said induction system;
  a traction control system detecting wheel slippage and adjusting distribution of driving torque for driving wheels when the magnitude of said wheel slippage is greater than a predetermined wheel slippage threshold;
  sensor means for monitoring driving parameters and for producing control parameter indicative signals;
  said engine driven device being connected to an engine output shaft to be driven by the engine output, said engine driven device including means for connecting and disconnecting said engine output shaft to and from said device; and
  a controller means for receiving said control parameter indicative signals and for controlling operation of said connecting and disconnecting means for selectively establishing connection and disconnection between said engine output shaft and said engine driven device, said controller means performing switching of the state of said connecting and disconnecting means between the connecting state and the disconnecting state when a condition satisfying a predetermined switching condition is detected from said control parameter indicative signals in a first control mode which is selected while said traction control system is held in an inactive state, and said controller means disabling the switching operation between said connecting state and said disconnecting state in a second control mode which is selected when said traction control system is in an active state.

10. A control system as set forth in claim 9, wherein said traction control system produces an active state indicative signal when it is active, and said controller means is responsive to said active state indicative signal to switch said control mode from said first mode to said second mode.

11. A control system as set forth in claim 10, wherein said traction control system includes a second throttle valve disposed in said air induction system, said second throttle valve being normally positioned at fully open position as long as said traction control is held in inactive state and decreasing open angle for reducing engine output torque depending upon magnitude of wheel slippage while said traction control is active.

12. A control system as set forth in claim 9, wherein said engine driven device comprises a compressor for an automotive air conditioner system, and said controller means detects an engine acceleration state for disconnecting said compressor from said engine output shaft and for otherwise establishing connection in said first mode.

13. A control means as set forth in claim 12, wherein said controller means maintains said disconnecting state for a predetermined period of time during engine acceleration in said first mode.

14. In an automotive vehicle having a manually operable accelerator and driving wheels, a control system comprising:
  an internal combustion engine having a combustion chamber;
  an air induction system for introducing an intake air into said combustion chamber, said air induction system having disposed therein a first throttle valve connected to the manually operable accelerator, the angular position of said first throttle valve depending upon an operation magnitude of the accelerator;
  sensor means for monitoring control parameters including an oxygen concentration in an exhaust gas produced by said engine and for producing control parameter indicative signals indicative of said monitored control parameters;
  a fuel supply system, connected to said air induction system, for supplying a fuel to said air induction system, said fuel supply system including means for varying a fuel supply amount of said fuel supplied to said air induction system;
  an auxiliary air induction system including a by-pass passage by-passing said first throttle valve, said auxiliary air induction system having disposed in said by-pass passage an auxiliary air flow control valve for adjusting an auxiliary air flow rate through said by-pass passage, said auxiliary air induction system including means for varying said auxiliary air flow rate;
  a traction control system detecting wheel slippage of the driving wheels and adjusting the distribution of driving torque for the driving wheels when the magnitude of said wheel slippage is greater than a predetermined wheel slippage threshold, said traction control system including a second throttle valve disposed in said air induction system in series with said first throttle valve, said traction control system having an inactive state in which said second throttle valve is positioned at a fully open position and an active state, said traction control system being normally in said inactive state and switched into said active state when the magnitude of said wheel slippage is greater than said predetermined wheel slippage threshold, said traction control system decreasing an opening angle of said second throttle valve for reducing engine output torque depending upon the magnitude of said wheel slippage when said traction control system is in said active state thereof; and
  a controller means for receiving said control parameter indicative signals and for controlling said auxiliary air flow rate varying means on the basis of said control parameter indicative signals, said controller means deriving a basic auxiliary air flow rate on the basis of preselected control parameters, said controller means modifying said basic auxiliary air flow rate on the basis of predetermined correction factors for controlling said auxiliary air flow rate varying means for adjusting said auxiliary air flow rate at the modified auxiliary air flow rate in a first mode which is selected when said traction control system is in said inactive state, and said controller means controlling said auxiliary air flow rate varying means for adjusting said auxiliary air flow rate at said basic auxiliary air flow rate in a second control mode which is selected when said traction control system is in said active state.

15. In an automotive vehicle having a manually operable accelerator and driving wheels:
  an internal combustion engine having a combustion chamber and an output shaft;
  an air induction system for introducing an intake air into said combustion chamber, said air induction system having disposed therein a first throttle valve connected to the manually operable accelerator, the angular position of said first throttle valve depending upon an operation magnitude of the accelerator;
  a traction control system detecting wheel slippage of the driving wheels and adjusting the distribution of driving torque for the driving wheels when the magnitude of said wheel slippage is greater than a predetermined wheel slippage threshold, said traction control system including a second throttle valve disposed in said air induction system upstream, said traction control system having an inactive state in which said second throttle valve is positioned at a fully open position and an active state, said traction control system being normally in said inactive state and switched into said active state when the magnitude of said wheel slippage is greater than said predetermined wheel slippage threshold, said traction control system decreasing an opening angle of said second throttle valve for reducing engine output torque depending upon the magnitude of said wheel slippage when said traction control system is in said active state thereof,
  said traction control system producing a traction control system active state indicative signal when said traction control system is in said active state;
  an air conditioner system including a compressor and clutch means for selectively connecting said compressor to said output shaft of said internal combustion engine;
  controller means responsive to said traction control system active state indicative signal for holding, when said traction control system active state indicative signal is present, said clutch means in an instantaneous position which said clutch means took immediately before said traction control system active state indicative signal has become present.

16. In an automotive vehicle having a manually operable accelerator and driving wheels:
  an internal combustion engine having a combustion chamber;
  an air induction system for introducing an intake air into said combustion chamber, said air induction system having disposed therein a first throttle valve connected to the manually operable accelerator, the angular position of said first throttle valve depending upon an operation magnitude of the accelerator;

a traction control system detecting wheel slippage of the driving wheels and adjusting the distribution of driving torque for the driving wheels when the magnitude of said wheel slippage is greater than a predetermined wheel slippage threshold, said traction control system including a second throttle valve disposed in said air induction system, said traction control system having an inactive state in which said second throttle valve is positioned at a fully open position and an active state, said traction control system being normally in said inactive state and switched into said active state when the magnitude of said wheel slippage is greater than said predetermined wheel slippage threshold, said traction control system decreasing an opening angle of said second throttle valve for reducing engine output torque depending upon the magnitude of said wheel slippage when said traction control system is in said active state thereof, said traction control system producing a traction control system active state indicative signal when said traction control system is in said active state;

an auxiliary air induction system including a by-pass passage by-passing said first throttle valve, said auxiliary air induction system having disposed in said by-pass passage an auxiliary air flow control valve for adjusting an auxiliary air flow rate through said by-pass passage, said auxiliary air induction system including means for varying said auxiliary air flow control valve; and controller means responsive to said traction control system active state indicative signal, said controller means deriving a basic auxiliary air flow rate and modifying said basic auxiliary air flow rate and controlling said auxiliary air flow control valve in response to said modified basic auxiliary air flow rate when said traction control system active state indicative signal is absent, said controller means deriving said basic auxiliary air flow rate and controlling said auxiliary air flow rate control valve in response to said basic auxiliary air flow rate when said traction control system active state indicative signal is present.

* * * * *